US009286571B2

(12) United States Patent
Cao et al.

(10) Patent No.: US 9,286,571 B2
(45) Date of Patent: Mar. 15, 2016

(54) MACHINE LEARNING FOR DATABASE MIGRATION SOURCE

(75) Inventors: Junwei Cao, Beijing (CN); Wei Chen, Beijing (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 223 days.

(21) Appl. No.: 13/879,799

(22) PCT Filed: Apr. 1, 2012

(86) PCT No.: PCT/CN2012/073455
§ 371 (c)(1),
(2), (4) Date: Aug. 21, 2013

(87) PCT Pub. No.: WO2013/149371
PCT Pub. Date: Oct. 10, 2013

(65) Prior Publication Data
US 2014/0019387 A1      Jan. 16, 2014

(51) Int. Cl.
*G06F 17/30*  (2006.01)
*G06N 99/00*  (2010.01)
*H04L 29/08*  (2006.01)

(52) U.S. Cl.
CPC ............ *G06N 99/005* (2013.01); *G06F 17/303* (2013.01); *H04L 67/1097* (2013.01)

(58) Field of Classification Search
CPC ................................................. G06F 17/30079
See application file for complete search history.

(56) References Cited

U.S. PATENT DOCUMENTS

| | | |
|---|---|---|
| 1,331,018 A | 2/1920 | Luthy |
| 4,356,549 A | 10/1982 | Chueh |
| 7,499,907 B2 | 3/2009 | Brown et al. |
| 7,690,037 B1 | 3/2010 | Hartmann |
| 7,698,324 B2 | 4/2010 | Vries |

(Continued)

FOREIGN PATENT DOCUMENTS

CN          101969475 A      2/2011

OTHER PUBLICATIONS

Revar et al., "Load Balancing in Grid Environment using Machine Learning-Innovative Approach", International Journal of Computer Applications (0975-8887) vol. 8-No. 10, Oct. 2010.

(Continued)

*Primary Examiner* — Stanley K Hill
*Assistant Examiner* — Ola Olude Afolabi
(74) *Attorney, Agent, or Firm* — Turk IP Law, LLC

(57) ABSTRACT

Technologies are generally provided for maintaining performance level of a database being migrated between different cloud-based service providers employing machine learning. In some examples, data requests submitted to an original data store/database may be submitted to a machine learning-based filter for recording and analysis. Based on the results of the data requests and the filter analyses, new key value structures for a new data store/database may be created. The filter may assign performance scores to the original data requests (made to the original data store) and data requests made to the newly-created key value structures. The filter may then compare the performance scores associated with the created key value structures to each other and to performance scores associated with the original data requests and may select the created key value structures with performance scores that are at least substantially equal to those of the original data requests for the new data store.

17 Claims, 7 Drawing Sheets

(56) References Cited

U.S. PATENT DOCUMENTS

| | | | |
|---|---|---|---|
| 8,447,729 B1* | 5/2013 | Wang et al. | 707/634 |
| 8,762,463 B2 | 6/2014 | Ravichandran et al. | |
| 2004/0024720 A1 | 2/2004 | Fairweather | |
| 2008/0005144 A1 | 1/2008 | Katz et al. | |
| 2008/0016095 A1 | 1/2008 | Bhatnagar et al. | |
| 2008/0037777 A1 | 2/2008 | Ignatius et al. | |
| 2008/0115123 A1 | 5/2008 | Kelly et al. | |
| 2009/0144393 A1 | 6/2009 | Kudo | |
| 2009/0254529 A1 | 10/2009 | Goldentouch | |
| 2009/0276771 A1 | 11/2009 | Nickolov et al. | |
| 2009/0313311 A1 | 12/2009 | Hoffmann et al. | |
| 2010/0061250 A1 | 3/2010 | Nugent | |
| 2010/0185968 A1 | 7/2010 | Hsu et al. | |
| 2010/0250497 A1 | 9/2010 | Redlich et al. | |
| 2010/0293147 A1 | 11/2010 | Snow et al. | |
| 2010/0321183 A1 | 12/2010 | Donovan et al. | |
| 2010/0332479 A1 | 12/2010 | Prahlad et al. | |
| 2010/0333116 A1 | 12/2010 | Prahlad et al. | |
| 2011/0040876 A1 | 2/2011 | Zhang et al. | |
| 2011/0066668 A1 | 3/2011 | Guarraci | |
| 2011/0078211 A1 | 3/2011 | Gass et al. | |
| 2011/0125895 A1 | 5/2011 | Anderson et al. | |
| 2011/0126197 A1 | 5/2011 | Larsen et al. | |
| 2011/0145580 A1 | 6/2011 | Auradkar et al. | |
| 2011/0179175 A1 | 7/2011 | Ravichandran et al. | |
| 2011/0179176 A1 | 7/2011 | Ravichandran et al. | |
| 2011/0179415 A1 | 7/2011 | Donnellan et al. | |
| 2011/0191361 A1 | 8/2011 | Gupta et al. | |
| 2011/0208710 A1 | 8/2011 | Lesavich | |
| 2011/0208808 A1 | 8/2011 | Corbett | |
| 2011/0225143 A1 | 9/2011 | Khosravy et al. | |
| 2011/0231280 A1 | 9/2011 | Farah | |
| 2011/0246550 A1 | 10/2011 | Levari et al. | |
| 2011/0246669 A1 | 10/2011 | Kanada et al. | |
| 2011/0252016 A1 | 10/2011 | Shacham et al. | |
| 2011/0258179 A1 | 10/2011 | Weissman et al. | |
| 2012/0022910 A1* | 1/2012 | Chi et al. | 705/7.22 |
| 2012/0036220 A1 | 2/2012 | Dare et al. | |
| 2012/0041881 A1 | 2/2012 | Basu et al. | |
| 2012/0047240 A1 | 2/2012 | Keohane et al. | |
| 2012/0054325 A1* | 3/2012 | Backa | 709/223 |
| 2012/0054731 A1 | 3/2012 | Aravamudan et al. | |
| 2012/0060142 A1 | 3/2012 | Fliess et al. | |
| 2012/0066395 A1 | 3/2012 | Ellis et al. | |
| 2012/0066632 A1 | 3/2012 | Sundermeyer et al. | |
| 2012/0072640 A1 | 3/2012 | Crawford et al. | |
| 2012/0072723 A1 | 3/2012 | Orsini et al. | |
| 2012/0072985 A1 | 3/2012 | Davne et al. | |
| 2012/0117054 A1 | 5/2012 | Shrinivas et al. | |
| 2012/0137001 A1 | 5/2012 | Ferris et al. | |
| 2012/0266167 A1 | 10/2012 | Spiers et al. | |
| 2013/0166550 A1 | 6/2013 | Buchmann et al. | |
| 2013/0262382 A1* | 10/2013 | Kruglick | 707/634 |

OTHER PUBLICATIONS

International Search Report and Written Opinion for PCT/CN2012/073455, filed Apr. 1, 2012, mailed on Jan. 10, 2013.

"Database index," accessed at http://en.wikipedia.org/wiki/Index_(database), modified on Feb. 24, 2012, pp. 8.

"How to move the Index location to a different Enterprise Vault (EV) server in the same site," Article: TECH51450, Aug. 9, 2011, pp. 8.

"Oracle Database, Advanced Application Developer's Guide 11 g Release1 (11.1 )," 828424-03, accessed at http://docs.oracle.com/cd/B28359_01/appdev.111/b28424/adfns_indexes.htm accessed on Aug. 21, 2014, pp. 8.

Bellare, M., et al., "Deterministic and efficiently searchable encryption," In Proceedings of CRYPTO, pp. 1-18, (2007).

Chapman, T., "Create database maintenance plans in SQL Server 2005 using SSIS," The Enterprise Cloud, pp. 1-10, Dec. 3, 2007.

International Search Report and Written Opinion for PCT/US12/31317, filed Mar. 29, 2012, mailed on Jun. 21, 2012.

Modi, V., "SQL Server Index Tuning I Clustered vs Non-Clustered Indexes," accessed at http://vijaymodi.wordpress.com/2007/03/24/sgl-server-index-tuning-clustered-vs-non-clustered-indexes/, posted on Mar. 24, 2007, pp. 4.

Pohlig, S. C., and Hellman, M. E., "An improved algorithm for computing logarithms over gf(p)and its cryptographic significance function" IEEE Transactions on Information Theory, pp. 1-18, (1978).

* cited by examiner

| NAME | TYPE | OTHER |
|---|---|---|
| USER ID | STRING | KEY |
| POST TITLE | STRING | |
| SEX | ENUM | {MALE, FEMALE} |
| POSTNUM | INT | KEY |
| AUTHOR ID | STRING | FOREIGN KEY |
| ... | ... | ... |

FIG. 4

MACHINE LEARNING FOR DATABASE MIGRATION SOURCE

CROSS REFERENCE TO RELATED APPLICATIONS

This Application is the U.S. National Stage filing under 35 U.S.C. §371 of PCT Application No. PCT/CN2012/073455 filed on Apr. 1, 2012. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

With the advance of networking and data storage technologies, an increasingly large number of computing services are being provided to users or customers by cloud-based datacenters that can enable access to computing resources at various levels. Cloud-based service providers may provide individuals and organizations with a range of solutions for systems deployment and operation. Depending on customer needs, datacenter capabilities, and associated costs, services provided to customers may be defined by Service Level Agreements (SLAs) describing aspects such as server latency, storage limits or quotas, processing power, scalability factors, backup guarantees, uptime guarantees, resource usage reporting, and similar ones.

The success of cloud-based services means that more and more applications and databases are being moved to the cloud. Customers (or tenants) typically prefer to have the option of moving applications and databases from one service provider to another while maintaining service parameters like performance, cost, liability, and similar ones. Service providers may prefer to have the option of moving an application or database from one site to another while maintaining performance and service level of the application.

When databases are moved between different service providers, database performance may not necessarily be maintained. Furthermore, the data structures of a particular database may not be easily transferrable between service providers, and redesigning the database for a new service provider may be resource-expensive.

SUMMARY

The present disclosure generally describes technologies for enabling a cloud server to maintain database performances upon transfer between cloud services with equivalent or different resource mixes.

According to some examples, a method for maintaining data store performances upon transfer between cloud computing environments may include submitting data requests to an original data store at a source datacenter, submitting the data requests to a filter for recording and analysis, and creating a new key value structure at a new data store at a target datacenter based on results of the requests to the original data store and analyses by the filter employing machine learning.

According to other examples, a computing device for maintaining data store performances upon transfer between cloud computing environments may include a memory configured to store instructions and a processing unit configured to execute a migration module in conjunction with the instructions. The migration module may submit data requests to an original data store at a source datacenter, submit the data requests to a filter for recording and analysis, and create a new key value structure at a new data store at a target datacenter based on results of the requests to the original data store and analyses by the filter employing machine learning.

According to further examples, a computer-readable storage medium may have instructions stored thereon for maintaining data store performances upon transfer between cloud computing environments. The instructions may include submitting data requests to an original data store at a source datacenter, submitting the data requests to a filter for recording and analysis, and creating a new key value structure at a new data store at a target datacenter based on results of the requests to the original data store and analyses by the filter employing machine learning.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 4 illustrates a set of example data and types in rebuilding a key value store in a system maintaining data store performances upon transfer between cloud computing environments;

DETAILED DESCRIPTION

Figure 1:
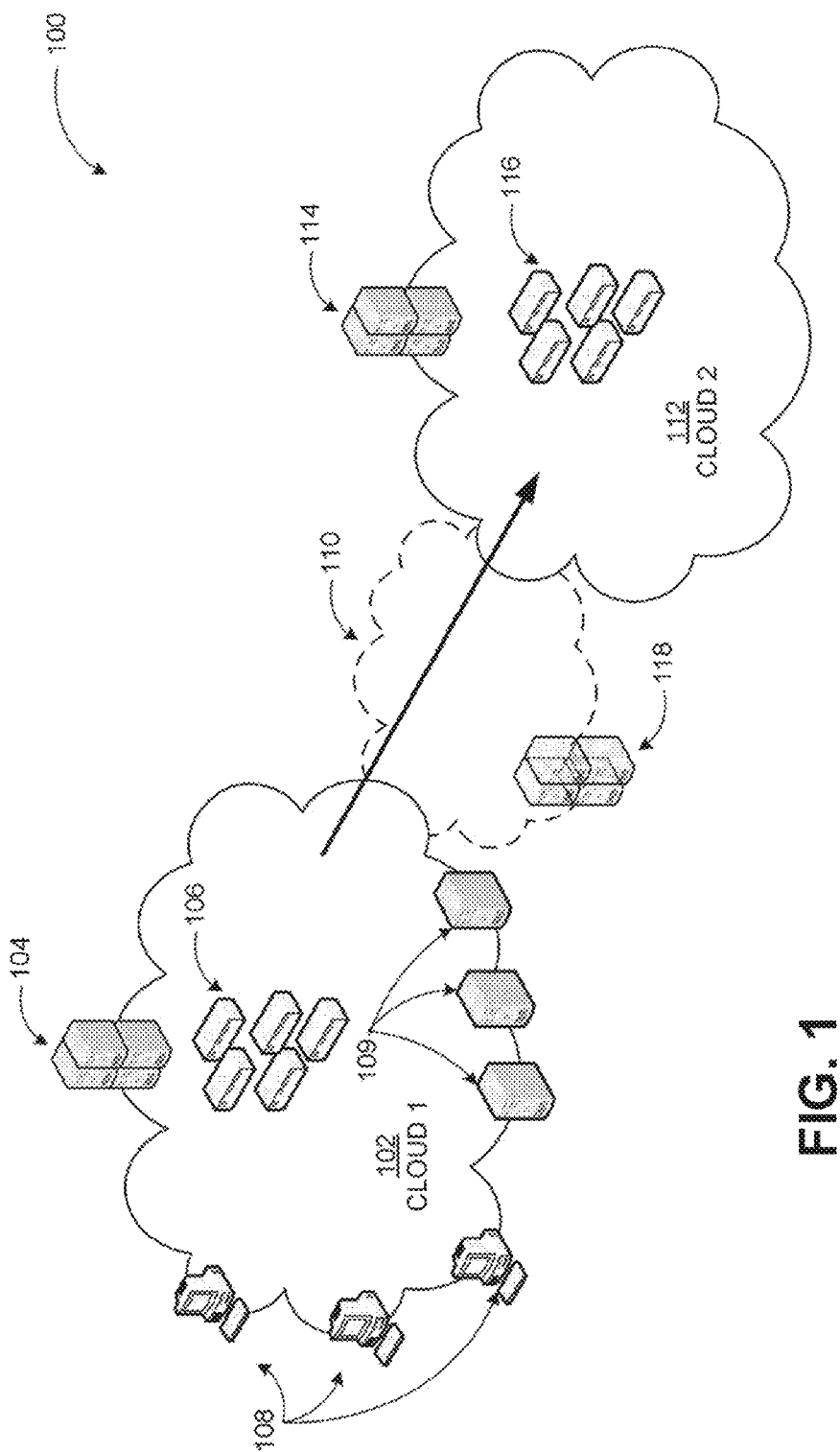
FIG. 1 illustrates an example system, where maintenance of data store performances upon transfer between cloud computing environments may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to employing machine learning in migrations between datacenters based on key value store performances.

Briefly stated, technologies are generally provided for maintaining performance level of a database being migrated between different cloud-based service providers employing machine learning. Data requests submitted to an original data store/database may be submitted to a machine learning-based filter for recording and analysis. Based on the results of the data requests and the filter analyses, new key value structures for a new data store/database may be created. The filter may assign performance scores to the original data requests (made to the original data store) and data requests made to the newly-created key value structures. The filter may then compare the performance scores associated with the created key value structures to each other and to performance scores associated with the original data requests and may select the created key value structures with performance scores that are at least substantially equal to those of the original data requests for the new data store.

FIG. 1 illustrates an example system, where maintenance of data store performances upon transfer between cloud computing environments may be implemented, arranged in accordance with at least some embodiments described herein.

As shown in a diagram 100, a service provider 102 (cloud 1) may host services such as various applications, data storage, data processing, or comparable ones for individual or enterprise customers 108 and 109. The service provider 102 may include one or more datacenters providing the services and employ one or more servers 104 and/or one or more special purpose devices 106 such as firewalls, routers, and so on. To provide services to its customers, the service provider 102 may employ multiple servers, special purpose devices, physical or virtual data stores, etc. Thus, an application hosted or data stored by the service provider 102 for a customer may involve a complex architecture of hardware and software components. The service level provided to the customer (owner of the hosted application or data) may be determined based on a number of service parameters such as server processing, memory, and networking, which may be implemented in a particular way by the service provider 102.

Cloud-based service providers may have disparate architectures and provide similar services but with distinct parameters. For example, data storage capacity, processing capacity, server latency, and similar aspects may differ from cloud to cloud. When migrating a database from one cloud to another, it may be desirable to maintain or improve the performance of the migrated database. This may be accomplished by using learning algorithms to construct and score key value structures based on the original database according to some example embodiments.

In the diagram 100, the service provider 102 (cloud 1) may be a source cloud and a service provider 112 (cloud 2) may be a target cloud in a migration process. Similar to the service provider 102, the service provider 112 may also employ one or more servers 114 and one or more special purpose devices 116 to provide its services. Database performance level determination and scoring may be managed and performed by one of the servers 104 of the service provider 102, one of the servers 114 of the service provider 112, or by a third party service executed on one or more servers 118 of another cloud 110.

Figure 2:
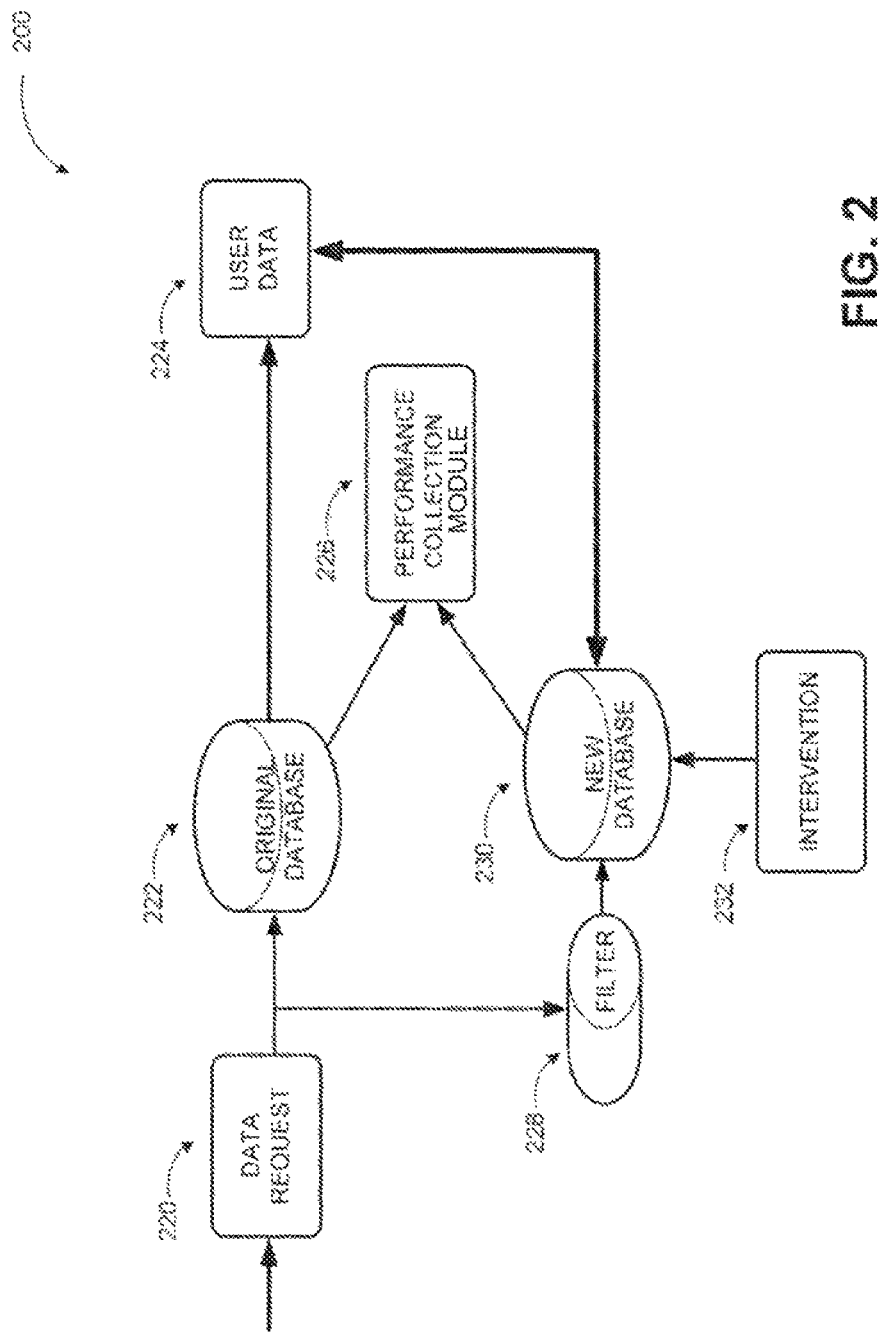
FIG. 2 illustrates example interactions between major components of a source datacenter and a target datacenter in maintaining data store performances upon transfer between cloud computing environments.

FIG. 2 illustrates example interactions between major components of a source datacenter and a target datacenter in maintaining data store performances upon transfer between cloud computing environments, arranged in accordance with at least some embodiments described herein.

As described earlier, when migrating a database between cloud computing environments (e.g., from a source datacenter to a target datacenter), it may be desirable to maintain or improve the performance of the migrated database. This may be accomplished by constructing new key value structures from the original database at the source datacenter using machine learning.

As shown in a diagram 200, the source datacenter may include an original database 222 and the target datacenter may include a new database 230. In an original operating process (i.e., before database migration), a data request 220 may be made to the original database 222, which may result in return of user data 224. In some examples, the data request 220 may include a type (e.g., query, write, and/or transaction for a relational-type database), a target table (or relation), one or more columns (or attributes), one or more comparison operations, and/or any other suitable information. For instance, an example data request to the original database 222 may be:

[1] Select post_title from table2 where AuthorID=Abcd1 and time>XXX, which may be abstracted as:

[2] Read {table2}, {post title, AuthorID, time}, {get, =>}.

Data request [1] may cause the original database 222 to return, as the user data 224, the values of a Post Title attribute from rows in a table2 having the Post_Title attribute as well as an AuthorID attribute and a Time attribute, where the AuthorID attribute matches "Abcd1" and the Time attribute is greater than time XXX.

When the original database 222 is to be migrated to the new database 230 associated with the target datacenter, attribute or column information associated with the original database 222 may first be extracted from the original database 222 and analyzed to determine their data types. Any data requests that are sent to the original database 222 (e.g., the data request 220) may also be sent to a filter 228. The filter 228 may record the data requests over a period of time, and may analyze them to determine identity of the information included in the data requests (e.g., type, target table, columns, comparison operations, and/or other suitable information). For example, the data request [1] described above is a query (or read) type request, with Table 2 as the target table, Post-Title, AuthorID, and time as the columns, and equal (=)/greater than (>) as the comparison operations.

The data requests to the original database 222 (e.g., the data request 220) recorded by the filter 228 may be used to construct new data structures in the new database 230 via a training process, and the user data (e.g., the user data 224) that the original database 222 returns in response to the data requests may be used to populate the resulting data structures in the new database 230. In some examples, the training process may be performed by the filter 228 simulating or repeating the recorded data requests to the new database 230. When the new database 230 receives a data request from the filter (e.g., the original data request or an abstracted version), it modifies its structure to meet the data request. For example, if the new database 230 is empty, and it receives an abstracted request as follows:

[3] Read {table1}, {AuthorID, time}, {=, >}, a new structure may be created as follows:

[4] make new table1; key→AuthorID, value→time, valuetype→time.

A subsequent abstracted request may be:

[5] Read {table2}, {post title, AuthorID, time}, {get, =, >}, which may cause the previously created structure to be modified as follows:

[6] modify table1; key→AuthorID, value→{time, post title}, valuetype→struct

[7] modify table1; key→ListNum, value→{AuthorID, time, post title}, valuetype→struct

[8] new tablet; key→ListNum, value→{AuthorID, post title}, valuetype→struct

Each new data structure may have a corresponding set of commands to replace the original data request(s) to the original database. These commands may be recorded, along with the new data structures, for testing and performance evaluation.

In some examples, instead of creating and training the new database 230 with a blank slate (i.e., starting with an empty database), an intervention 232 may be provided, which may supply an initial, basic database structure for the new database 230. For example, the intervention 232 may take the form of a basic table structure. In some examples, the intervention 232 may be provided by one or more database technicians or programmers.

Once one or more data structures in the new database 230 have been created by, e.g., the filter 228 providing the recorded data requests to the new database 230 as described above, a performance collection module 226 may score the performance of the created data structures. The performance collection module 226 may collect indices of performance such as processing time, read time, write time, or any other suitable database performance indices, and in some examples may combine the collected indices into one or more aggregate database performance scores. If at least some of the performance indices/scores for a particular instantiation of the new database 230 do not meet or exceed the performance indices/scores for the original database 222, that particular database instantiation and its data structures may be discarded. If at least some of the performance indices/scores for a particular instantiation of the new database 230 do meet or exceed the performance indices/scores for the original database, that particular instantiation and its scores may be recorded. In either case, the database creation process may be repeated, resulting in a number of potential instantiations of the new database 230, and the instantiation that provides the optimum performance may be selected as the final structure for the new database 230.

In some examples, the data requests and associated information recorded by the filter 228 over a period of time may provide one or more probability distributions for any of the information included in the data requests (e.g., type, target table, columns, comparison operations, and/or other suitable information). This probability distribution information, if used to generate and/or train the new database 230 as described above, may result in database performance equal to or better than the original database 222.

Figure 3:
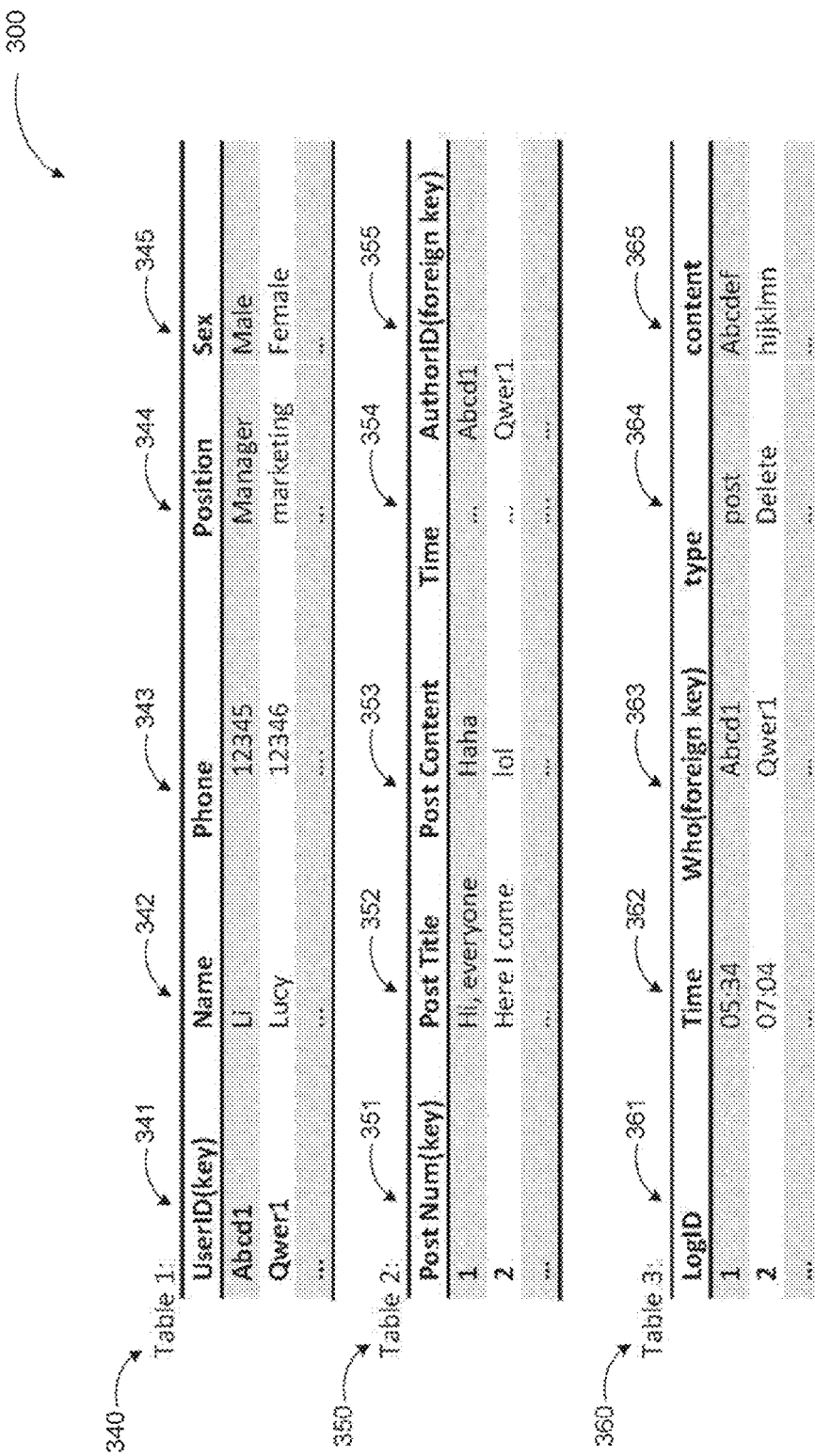
FIG. 3 illustrates an example original database in a system maintaining data store performances upon transfer between cloud computing environments.

FIG. 3 illustrates an example original database 300 arranged in accordance with at least some embodiments described herein. The original database 300 may be similar to the original database 222 in FIG. 2. In some examples the database 300 may be a relational database, such as a Structured Query Language (SQL) database.

In the example shown in FIG. 3, the original database 300 may include three tables (or relations): Table 1 (340), Table 2 (350) and Table 3 (360). The table 1 (340) may include five attributes: a UserID attribute 341 (which is also the key to the Table 1), a Name attribute 342, a Phone attribute 343, a Position attribute 344, and a Sex attribute 345. The table 2 (350) also may include five attributes: a Post Num attribute 351 (which is also the key to the Table 2), a Post Title attribute 352, a Post Content attribute 353, a Time attribute 354, and an AuthorID attribute 355 (which is a foreign key that may correspond to the UserID attribute 341). The table 3 (360) may include five attributes: a LogID attribute 361, a Time attribute 362, a Who attribute 363 (which is a foreign key that may correspond to the UserID attribute 341 and/or the AuthorID attribute 355), a Type attribute 364, and a Content attribute 365. In the original database 300, each of the tables may include at least two rows (or tuples), each containing a data entry. Although the database 300 shown in FIG. 3 includes three tables, each with five attributes/columns and two rows, it should be understood that the database 300 may contain more or fewer tables, attributes/columns, and/or rows.

FIG. 4 illustrates a table 400 containing a set of example data and types extracted from the database 300 shown in FIG. 3 that may be used in rebuilding a key value store in a system maintaining data store performances upon transfer between cloud computing environments, arranged in accordance with at least some embodiments described herein. As shown in a first column 472 of the table 400, the database 300 shown in FIG. 3 may include a number of attributes, each of which may correspond to an attribute or column of a table in the database 300. Each of these attributes (e.g., User ID, Post Title, Sex, Postnum, Author ID, etc.) may have an associated data type, which may be listed in a second column 474 of the table 400. For example, a User ID attribute may have a data type of string, whereas a Postnum attribute may have a data type of int (or integer). Each attribute may also have one or more special features or notes associated with it, which may be listed in a third column 476 of the table 400. For example, an attribute may serve as a key (e.g., User ID or Postnum) or a foreign key (e.g., Author ID) for a table or relation. As another example, an attribute of type enum may have its potential values listed in the third column 476 (e.g., the attribute Sex, of type enum, may have potential values of male or female, as noted in the third column 476).

The information in the table 400 (e.g., the names shown in the first column 472, the data types shown in the second column 474, and the special features/notes shown in the third column 476) may be used to construct key value stores for database migration between datacenters or cloud service providers. For example, if the target datacenter/service provider cannot support certain data types associated with one or more attributes in the original database, the table 400 may be used to determine which attributes may be affected, and appropriate replacement types may be selected for the affected attributes. As another example, since some key-value stores may not support foreign key functionality without further processing, if the original database is to be migrated to key-value store structures, the table 400 may be used to determine the presence of foreign keys for further processing.

Figure 5:
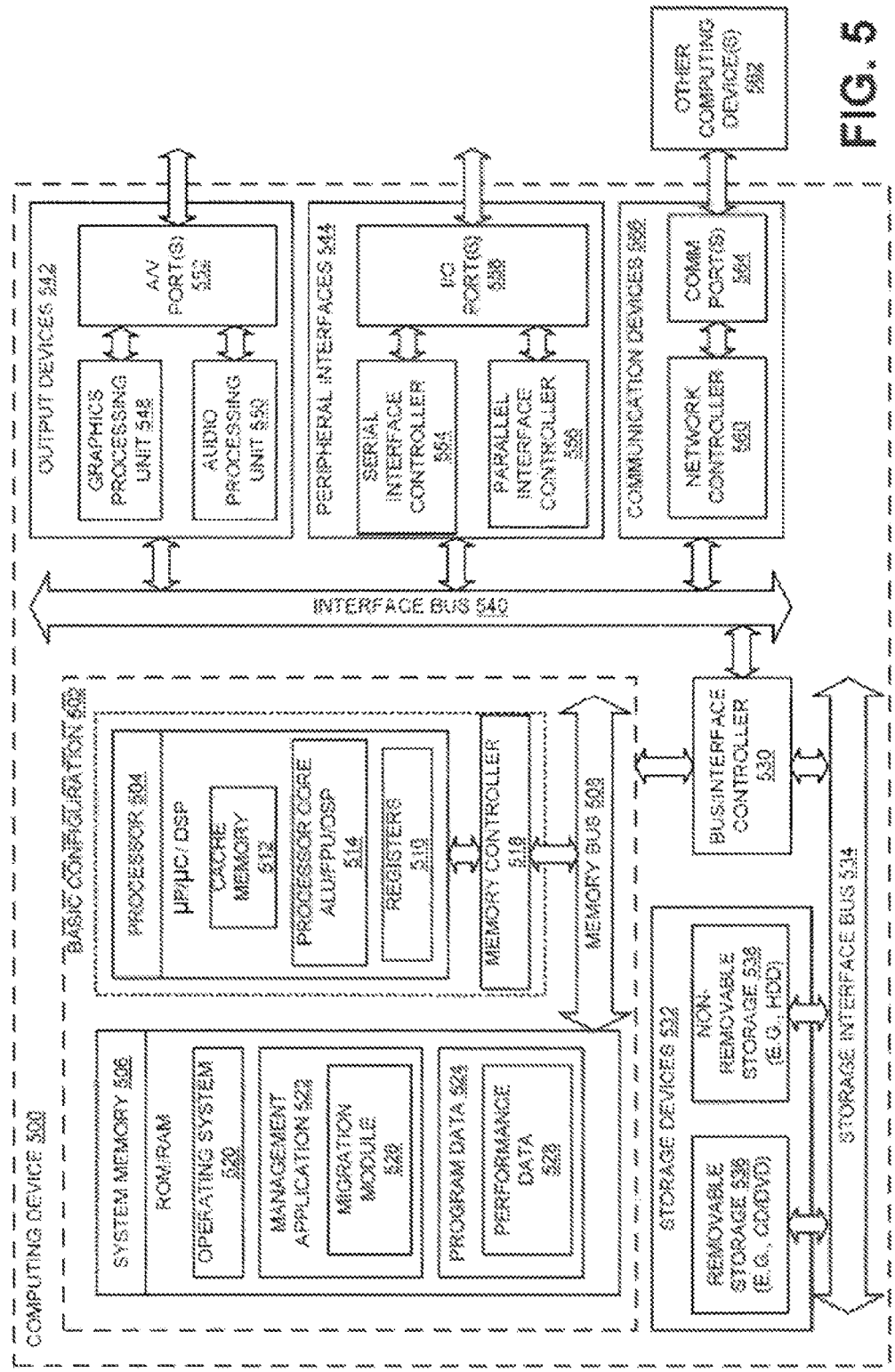
FIG. 5 illustrates a general purpose computing device, which may be used to maintain data store performances upon transfer between cloud computing environments.

FIG. 5 illustrates a general purpose computing device 500, which may be used to maintain application performances upon transfer between cloud computing environments, arranged in accordance with at least some embodiments described herein. For example, the computing device 500 may be used as servers 104, 114, or 118 of FIG. 1. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524. The applications 522 may include a cloud management application, including a migration module 526, which may employ machine learning for migrations between datacenters based on key value store performances as described herein. The program data 524 may include, among other data, performance data 528, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods for maintaining application performances upon transfer between cloud servers. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
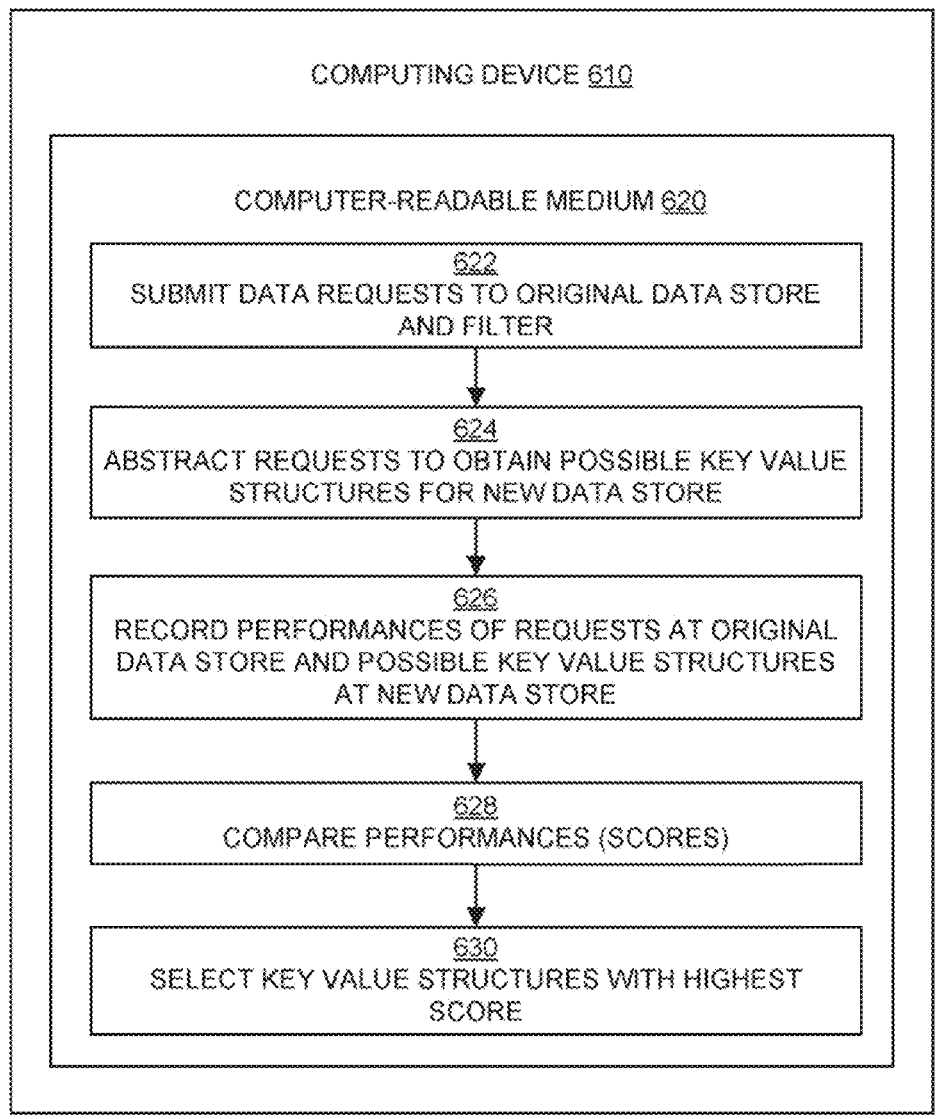
FIG. 6 is a flow diagram illustrating an example method that may be performed by a computing device such as the device in FIG. 5.

FIG. 6 is a flow diagram illustrating an example method that may be performed by a computing device such as device 500 in FIG. 5, arranged in accordance with at least some embodiments described herein. Example methods may include one or more operations, functions or actions as illustrated by one or more of blocks 622, 624, 626, 628, and/or 630. The operations described in the blocks 622 through 630 may also be stored as computer-executable instructions in a computer-readable medium such as a computer-readable medium 620 of a computing device 610.

An example process for maintaining database performance upon transfer between cloud servers may begin with block 622, "SUBMIT DATA REQUESTS TO ORIGINAL DATA STORE AND FILTER", where a migration module or application (e.g., the migration module 526) executed on a source cloud server (e.g., the servers 104 of FIG. 1), a target cloud server (e.g., the servers 114 of FIG. 1), or a third party server (e.g., the servers 118 of FIG. 1) may submit data requests (e.g., the data request 220 in FIG. 2) to an original data store (e.g., the original database 222 in FIG. 2) and a filter (e.g., the filter 228 in FIG. 2), as described in FIG. 2.

Block 622 may be followed by block 624, "ABSTRACT REQUESTS TO OBTAIN POSSIBLE KEY VALUE STRUCTURES FOR NEW DATA STORE", where the migration module 526 may convert the data requests submitted in block 622 to abstract requests (e.g., the requests [2], [3], and [5] as described above). In examples, the data requests and/or the abstract requests may be recorded and later simulated or repeated to a new database for training One or more possible key value structures for a new data store may be obtained by analyzing the abstract requests, as described above in relation to the filter 228, the abstract requests [3] and [5], and the structure statements [4], [6], [7], and [8].

Block 624 may be followed by block 626, "RECORD PERFORMANCES OF REQUESTS AT ORIGINAL DATA STORE AND POSSIBLE KEY VALUE STRUCTURES AT NEW DATA STORE", where one or more performance indices (e.g., processing time, read time, write time, and so on) are collected for data requests (e.g., the data requests of block 622) made to the original data store. The same performance indices may also be recorded for the same data requests made to the one or more possible key value structures for the new data store obtained in block 624.

Block 626 may be followed by block 628, "COMPARE PERFORMANCES (SCORES)", where the performance indices recorded in block 626 for the original data store and the one or more possible key value structures for the new data store may be compared. In some examples, individual performance indices for a data request made to the original data store may be compared with individual performance indices for a data request made to the key value structures in the new data store. In some examples, the performance indices for data requests may be aggregated (e.g., by type of request, type of data, target database, or any other suitable parameter) and then compared to each other.

Block 628 may be followed by block 630, "SELECT KEY VALUE STRUCTURES WITH HIGHEST SCORE", where key value structures with the highest performance score or relevant performance indices (as determined in block 628) may be selected for the new database. In some examples, the key value structures with the highest performance scores are selected from a plurality of possible key value structures.

The blocks included in the above described process are for illustration purposes. Maintaining application performances upon transfer between cloud servers may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
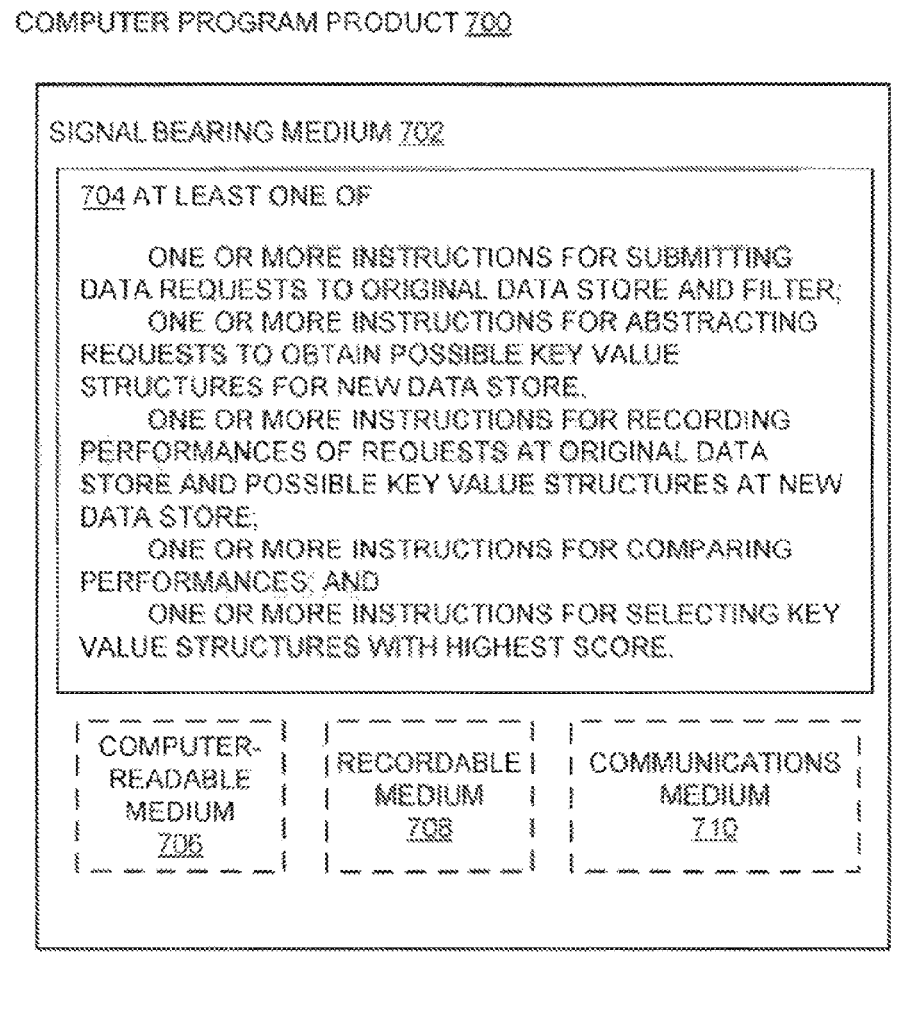
FIG. 7 illustrates a block diagram of an example computer program product, all arranged in accordance with at least some embodiments described herein.

FIG. 7 illustrates a block diagram of an example computer program product arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the migration module 526 may undertake one or more of the tasks shown in FIG. 7 in response to the instructions 704 conveyed to the processor 504 by the signal bearing medium 702 to perform actions associated with maintaining database performances upon transfer between cloud servers as described herein. Some of those instructions may include, for example, instructions for submitting data requests to an original data store and/or a filter, abstracting requests to obtain possible key value structures for a new data store, recording performances of requests at the original data store and possible key value structures at the new data store, comparing performances, and selecting key value structures with the highest score according to some embodiments described herein.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 by an RF signal bearing medium, where the signal bearing medium 702 is conveyed by the wireless communications medium 710 (e.g., a wireless communications medium conforming with the IEEE 802.11 standard).

According to some examples, a method for maintaining data store performances upon transfer between cloud computing environments may include submitting data requests to an original data store at a source datacenter, submitting the data requests to a filter for recording and analysis, and creating a new key value structure at a new data store at a target datacenter based on results of the requests to the original data store and analyses by the filter employing machine learning.

According to other examples, the filter is configured to determine the new key value structure based on a probability of types of the requests to the original data store. The filter may be further configured to abstract each request to the original data store. The abstraction may include determination of a type of each request, a table associated with each request, a column associated each request, and a comparison operation. In some examples, an abstracted request includes a list of possible key value structures that meet the request to the original data store. The method may further include recording possible key value structures and commands associated with replacing the request to the original data store for subsequent testing. In some examples, the filter is further configured to simulate and repeat a series of recorded requests to the new data store to train the new data store. The method may further include assigning a score to each original data store performance and each new data store performance.

According to further examples, the method may further include collecting scores of original data store performances and scores of new data store performances for the query and a corresponding key value structure at the new data store, comparing the scores of the original data store performances and the scores of the new data store performances, and if the scores of the original data store performances are not substantially equal to the scores of the new data store performances, discarding the corresponding key value structure. In some examples, if the scores of the new data store performances are substantially equal to or better than the scores of the original data store performances, the method may further include recording the scores of the new data store performances for the corresponding key value structure, and/or selecting a key value structure with a highest score among a plurality of possible key value structures corresponding to an abstracted query at the new data store. Performances may include a processing time, a reading time, and/or a writing time.

According to some examples, the original data store is a relational database. The relational database may be a Structured Query Language (SQL) database. In some examples, the original data store may store key values. The results of the requests to the original data store may be stored in the new data store as user data. The requests to the original data store may be a query, a write, and/or a transaction. In some examples, the method may include receiving basic table at a beginning of a training process for key value structures at the new data store.

According to other examples, a computing device for maintaining data store performances upon transfer between cloud computing environments may include a memory configured to store instructions and a processing unit configured to execute a migration module in conjunction with the instructions. The migration module may submit data requests to an original data store at a source datacenter, submit the data requests to a filter for recording and analysis, and create a new key value structure at a new data store at a target datacenter based on results of the requests to the original data store and analyses by the filter employing machine learning.

According to other examples, the filter is configured to determine the new key value structure based on a probability of types of the requests to the original data store. The filter may be further configured to abstract each request to the original data store. The abstraction may include determination of a type of each request, a table associated with each request, a column associated each request, and a comparison operation. In some examples, an abstracted request includes a list of possible key value structures that meet the request to the original data store. The migration module may be further configured to record possible key value structures and commands associated with replacing the request to the original data store for subsequent testing. In some examples, the filter is further configured to simulate and repeat a series of recorded requests to the new data store to train the new data store. The migration module may be further configured to assign a score to each original data store performance and each new data store performance.

According to further examples, the migration module may be further configured to collect scores of original data store performances and scores of new data store performances for the query and a corresponding key value structure at the new data store, compare the scores of the original data store performances and the scores of the new data store performances, and if the scores of the original data store performances are not substantially equal to the scores of the new data store performances, discard the corresponding key value structure. In some examples, if the scores of the new data store performances are substantially equal to or better than the scores of the original data store performances, the migration module may be further configured to record the scores of the new data store performances for the corresponding key value structure, and/or select a key value structure with a highest score among a plurality of possible key value structures corresponding to an abstracted query at the new data store. Performances may include a processing time, a reading time, and/or a writing time.

According to some examples, the original data store is a relational database. The relational database may be a Structured Query Language (SQL) database. In some examples, the original data store may store key values. The results of the requests to the original data store may be stored in the new data store as user data. The requests to the original data store may be a query, a write, and/or a transaction. In some examples, the migration module may be further configured to receive basic table at a beginning of a training process for key value structures at the new data store.

According to further examples, a computer-readable storage medium may have instructions stored thereon for maintaining data store performances upon transfer between cloud computing environments. The instructions may include submitting data requests to an original data store at a source datacenter, submitting the data requests to a filter for recording and analysis, and creating a new key value structure at a new data store at a target datacenter based on results of the requests to the original data store and analyses by the filter employing machine learning.

According to other examples, the filter is configured to determine the new key value structure based on a probability of types of the requests to the original data store. The filter may be further configured to abstract each request to the original data store. The abstraction may include determination of a type of each request, a table associated with each request, a column associated each request, and a comparison operation. In some examples, an abstracted request includes a list of possible key value structures that meet the request to the original data store. The instructions may further include recording possible key value structures and commands associated with replacing the request to the original data store for subsequent testing. In some examples, the filter is further configured to simulate and repeat a series of recorded requests to the new data store to train the new data store. The instructions may further include assigning a score to each original data store performance and each new data store performance.

According to further examples, the instructions may further include collecting scores of original data store performances and scores of new data store performances for the query and a corresponding key value structure at the new data store, comparing the scores of the original data store performances and the scores of the new data store performances, and if the scores of the original data store performances are not substantially equal to the sores of the new data store performances, discarding the corresponding key value structure. In some examples, if the scores of the new data store performances are substantially equal to or better than the scores of the original data store performances, the instructions may further include recording the scores of the new data store performances for the corresponding key value structure, and/or selecting a key value structure with a highest score among a plurality of possible key value structures corresponding to an abstracted query at the new data store. Performances may include a processing time, a reading time, and/or a writing time.

According to some examples, the original data store is a relational database. The relational database may be a Structured Query Language (SQL) database. In some examples, the original data store may store key values. The results of the requests to the original data store may be stored in the new data store as user data. The requests to the original data store may be a query, a write, and/or a transaction. In some examples, the instructions may include receiving basic table at a beginning of a training process for key value structures at the new data store.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to maintain data store performances upon transfer between cloud computing environments, the method comprising:
    submitting data requests to an original data store at a source datacenter;
    submitting the data requests to a filter to record and analyze;
    creating a new key value structure at a new data store at a target datacenter based on results of the requests to the original data store and analyses by the filter that employs machine learning;
    assigning a score to each original data store performance and each new data store performance;
    collecting scores of original data store performances and scores of new data store performances for a query and a corresponding key value structure at the new data store;
    comparing the scores of the original data store performances and the scores of the new data store performances; and
    in response to a determination that the scores of the original data store performances are not substantially equal to the scores of the new data store performances, discarding the corresponding key value structure.

2. The method according to claim 1, further comprising:
    in response to a determination that the scores of the new data store performances are substantially equal to or better than the scores of the original data store performances, recording the scores of the new data store performances for the corresponding key value structure.

3. The method according to claim 2, further comprising:
    selecting a key value structure with a highest score among a plurality of possible key value structures corresponding to an abstracted query at the new data store.

4. The method according to claim 1, wherein performances include one or more of a processing time, a reading time, and a writing time.

5. The method according to claim 1, wherein the original data store is a relational database.

6. The method according to claim 1, further comprising:
    receiving a basic table at a beginning of a training process for key value structures at the new data store.

7. A computing device to maintain data store performances upon transfer between cloud computing environments, the computing device comprising:
    a memory configured to store instructions; and
    a processing unit configured to execute a migration module in conjunction with the instructions, wherein the migration module is configured to:
        submit data requests to an original data store at a source datacenter;
        submit the data requests to a filter to record and analyze, wherein the filter is further configured to abstract each request to the original data store; and
        create a new key value structure at a new data store at a target datacenter based on results of the requests to the original data store and analyses by the filter that employs machine learning;
        assign a score to each original data store performance and each new data store performance;
        collect scores of original data store performances and scores of new data store performances for a query and a corresponding key value structure at the new data store;
        compare the scores of the original data store performances and the scores of the new data store performances; and
        in response to a determination that the scores of the original data store performances are not substantially equal to the scores of the new data store performances, discard the corresponding key value structure.

8. The computing device according to claim 7, wherein the filter is configured to determine the new key value structure based on a probability of types of the requests to the original data store.

9. The computing device according to claim 8, wherein the filter is further configured to simulate and repeat a series of recorded requests to the new data store to train the new data store.

10. The computing device according to claim 7, wherein the abstraction includes determination of a type of each request, a table associated with each request, a column associated with each request, and a comparison operation.

11. The computing device according to claim 7, wherein an abstracted request includes a list of possible key value structures that meet the request to the original data store.

12. The computing device according to claim 11, wherein the migration module is further configured to:
    record the possible key value structures and commands associated with replacing the request to the original data store for subsequent testing.

13. The computing device according to claim 7, wherein the original data store stores key values.

14. The computing device according to claim 7, wherein the results of the requests to the original data store are stored in the new data store as user data.

15. The computing device according to claim 7, wherein the requests to the original data store are one or more of a query, a write, and a transaction.

16. A non-transitory computer-readable storage medium having instructions stored thereon to maintain data store performances upon transfer between cloud computing environments, the instructions comprising:
    submitting data requests to an original data store at a source datacenter;
    submitting the data requests to a filter to record and analyze;
    creating a new key value structure at a new data store at a target datacenter based on results of the requests to the original data store and analyses by the filter that employs machine learning; and
    assigning a score to each original data store performance and each new data store performance;
    collecting scores of original data store performances and scores of new data store performances for a query and a corresponding key value structure at the new data store;
    comparing the scores of the original data store performances and the scores of the new data store performances; and
    in response to a determination that the scores of the original data store performances are not substantially equal to the scores of the new data store performances, discarding the corresponding key value structure.

17. The non-transitory computer-readable storage medium according to claim 16, wherein the instructions further comprise:
    receiving a basic table at a beginning of a training process for key value structures at the new data store.

* * * * *